April 16, 1935. A. J. MASSEY 1,997,778
STREET SIGNAL SYSTEM
Filed Feb. 23, 1926 6 Sheets-Sheet 1
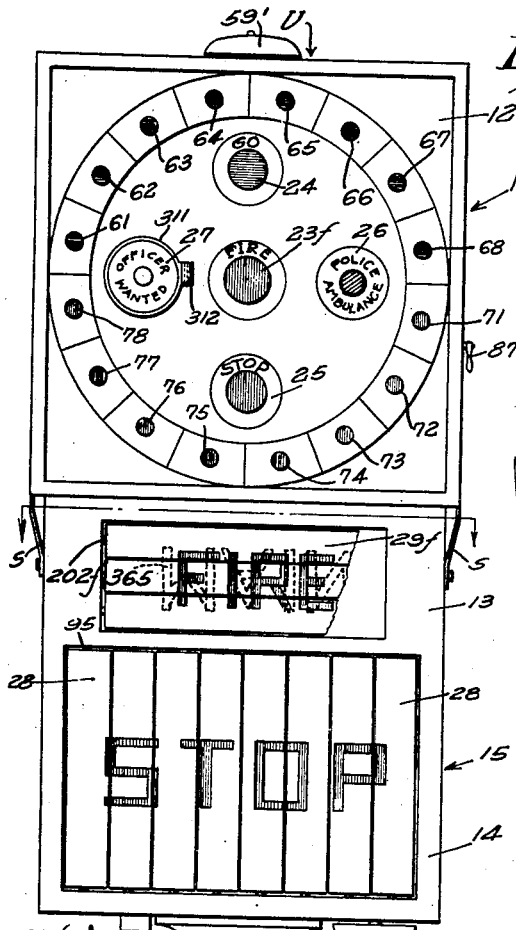
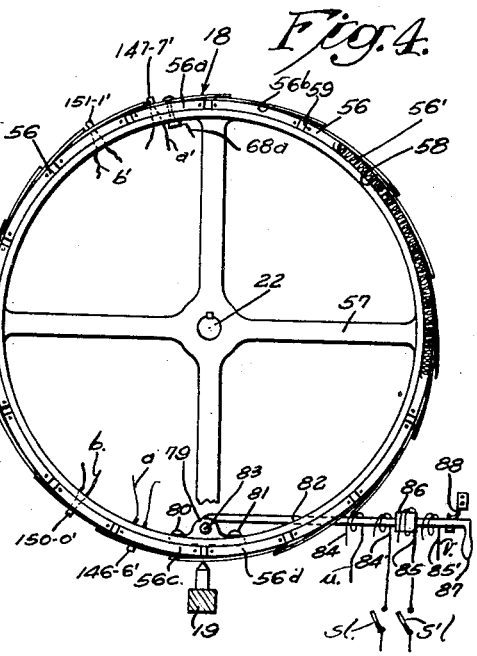
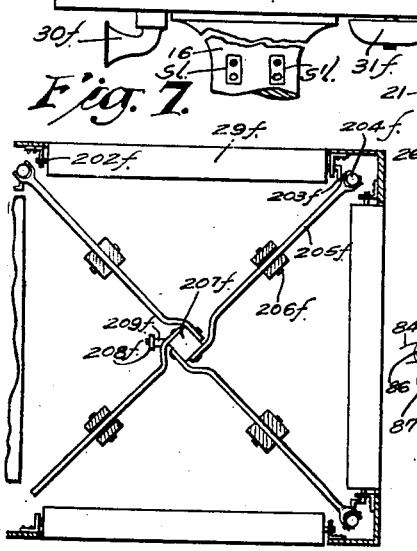
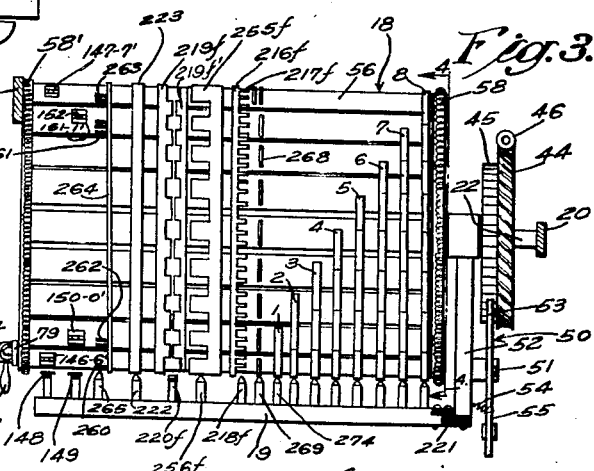
INVENTOR
Alexander J. Massey
By
ATTORNEY April 16, 1935.  A. J. MASSEY  1,997,778
STREET SIGNAL SYSTEM
Filed Feb. 23, 1926   6 Sheets-Sheet 2

INVENTOR
Alexander J. Massey
By
Russel A. Graham
ATTORNEY

April 16, 1935.   A. J. MASSEY   1,997,778
STREET SIGNAL SYSTEM
Filed Feb. 23, 1926   6 Sheets-Sheet 3

INVENTOR
Alexander J. Massey
By
Frank A. Graham
ATTORNEY

April 16, 1935.  A. J. MASSEY  1,997,778
STREET SIGNAL SYSTEM
Filed Feb. 23, 1926   6 Sheets-Sheet 4

INVENTOR
ALEXANDER J. MASSEY
ATTORNEY

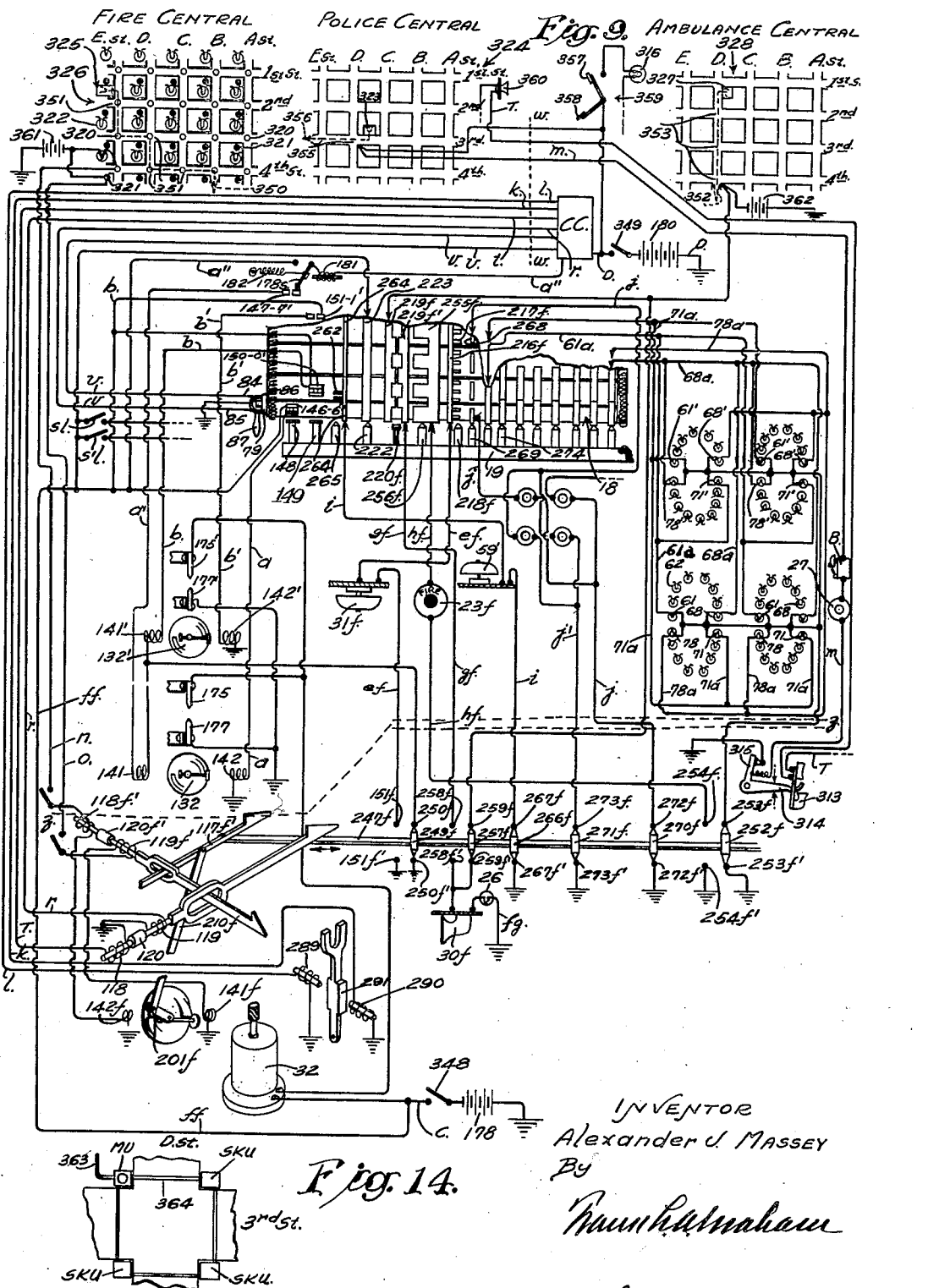

April 16, 1935.  A. J. MASSEY  1,997,778
STREET SIGNAL SYSTEM
Filed Feb. 23, 1926  6 Sheets-Sheet 6
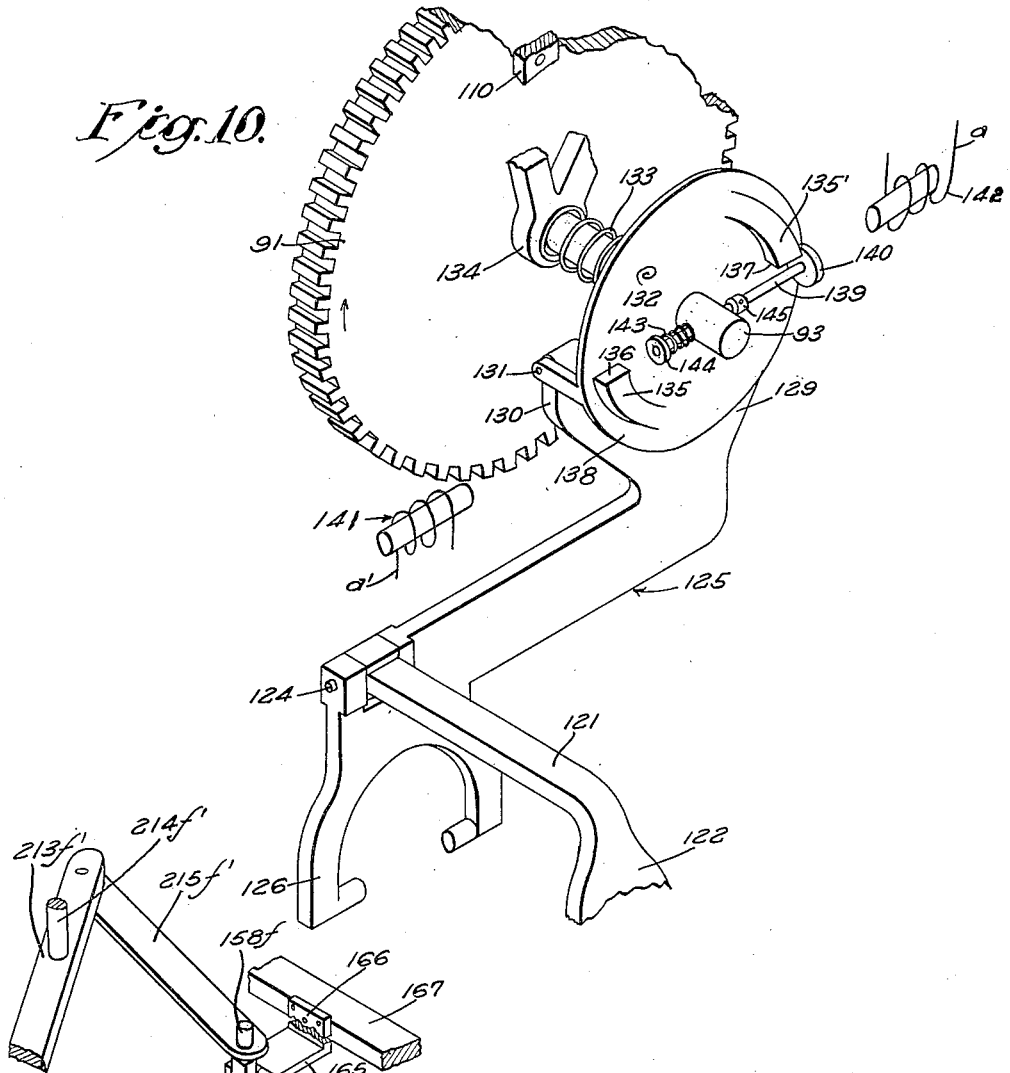
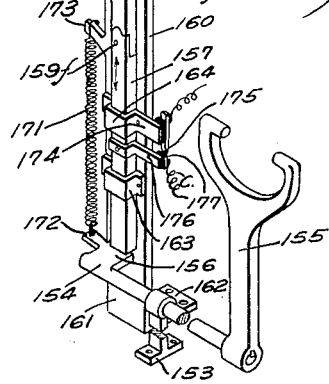
INVENTOR
Alexander J. Massey
By
Russell A. Graham
ATTORNEY Patented Apr. 16, 1935

1,997,778

UNITED STATES PATENT OFFICE 1,997,778

STREET SIGNAL SYSTEM

Alexander J. Massey, Los Angeles, Calif.

Application February 23, 1926, Serial No. 89,895

16 Claims. (Cl. 177—337)

This invention relates to a street signal system, and more particularly to a signal system combining novel electromagnetic features, with novel mechanical features, and relying in part upon the principles disclosed in patents issued to me as follows: No. 1,640,845, granted August 30, 1927; No. 1,817,754, granted August 4, 1931; and No. 1,875,748, granted September 6, 1932.

This invention provides (1) means, preferably in the form of four-faced local units, for the control of street traffic, such control being, in large part, predetermined from a central station; and (2) means for giving advance signals, along a route which is to be traversed by fire apparatus; and (3) means for giving different advance signals, along a route which is to be traversed by a police or ambulance vehicle; but also (4) means whereby the local officers, at street intersections, may be called to their respective local signals, to receive or give information or instructions; and (5) means whereby said local officers, upon lifting telephone receivers, automatically assure a central authority of their presence and attention; and also (6) means whereby, whenever fire apparatus and police or ambulance vehicles are both out, each may be warned as to intersections in the routes thereof, in order to avoid collision.

For the sake of completeness, I hereinafter give full details of an advantageous and unique type of signal unit, including means for giving, during daylight or busy hours, routine signals, at predetermined intervals, for the control of traffic (the impulses for some changes at the respective signal units being provided by means under the control of central officers, and variable, at will, by means under the control of central officers, and variable also by means under the control of local officers, at street intersections) and one essential point of novelty in my traffic signalling organization, aside from my provision of units provided with four faces, operating in pairs, is the provision of means for visibly indicating, with approxmate accuracy, the interval of time that must elapse before an ensuing change in the direction of traffic; but I herein emphasize especially certain novel features adapting my signals to use in the routing of fire apparatus, and/or police or ambulance wagons, my means for calling local officers to their respective units, my means for indicating, at a central station, the attention of such officers, and certain features of detail or of interconnection by which the mentioned means are rendered functionally interdependent.

As to the fire signal features of my invention, my organization is such that when a fire signal is given from, for example, a central fire station, the official who gives the signal is enabled to do this incidentally to the choice and indication of a route,—as by running his finger over a special chart provided with switches at points indicating the intersections of streets. As he passes his finger over the selected intersections, the "fire" signal faces are brought into view, gongs associated therewith are sounded, and red, flickering lights are made to appear at all intersections, or other points, at which signals are installed along the route. All the traffic signal "Stop" faces may also be brought into view, to hold the traffic at a standstill until released. If a fire signal is given in the day time, and when a traffic signal has indicated "Go", as soon as the fire signal or alarm is given, the "Stop" signal faces will nevertheless promptly appear on all four sides of each signal unit,—although subject to release either by a central or by a local officer. Such release may be effected immediately after the fire apparatus has passed, the usual traffic signals then operating, as before, automatically.

If a fire signal is given at night, or at any time when the traffic signal faces have been made to disappear (the day traffic rules being suspended) as soon as the fire signal, with or without another signal, is given, the traffic signal "Stop" faces are caused promptly to appear, to "hold" all ordinary traffic,—although subject to release in the general manner indicated. When released, the signal vanes all return to their invisible positions,—neither the "Stop" faces nor the "Go" faces being visible.

It will be recognized as highly advantageous to provide alarm means controllable in the general manner outlined above, in order that pedestrians and drivers may be warned in advance,—and not merely by the fire apparatus, as it may approach each intersection. Such advance warnings enable pedestrians and drivers to reach places of safety and also enable the fire apparatus to "make time",—with obvious advantages to the public safety and even in the consequent lowering of insurance rates.

A separate "central" may be employed in the case of police or ambulance vehicles; and, when both fire and police or ambulance vehicles are out, each is warned to avoid collision with the other. The respective centrals may be located in different parts of a city; and the routes for the fire apparatus and the police or ambulance vehicles may be predetermined simultaneously or successively, even by central officials who are not in communication. As they choose their respective routes, if one is selected in advance of the other, as soon as a second puts on his signals, the system will operate just the same as if both were put on at once. As the sounds and lights used in the case of fire are different from those used in the case of police or ambulance vehicles, one set of signals does not interfere with the other, although serving to obviate risk of collision.

When a crime of any kind has been committed, a local police officer can be called, at the intersection where he may be stationed,—this feature of my organization rendering it unnecessary for a central police authority to wait until the local officer calls up, before he can be informed or questioned. With my signal system, when information reaches the central police station, the central official can at once call any desired intersection or intersections where signal units are provided, and can inform the local officers in time to prevent an escape. As the police signal is given by central, a local bell may be made to ring, and a distinctive light displayed, in such manner as to attract the local officer's attention. As he answers, lifting a telephone receiver, his bell stops ringing and the distinctive light goes out,—as also does a corresponding light at the central station. The official at the central station may repeat a message or set of instructions or inquiries until one or all of the lights on his switchboard are extinguished, incidentally to the responses of the respective local officers.

The police signal system may include means whereby the police officers of an entire city, or any desired section thereof, may simultaneously be put in communication with central; and, if desired, the arrangement may be such that, incidentally to or independently of the establishment of the mentioned communication, all four faces of the selected local signal units may be made to display "Stop" signals,—to bring all traffic to a halt, thereby preventing criminals, whether on foot or in machines, from disappearing in streams of moving traffic.

My signal units can be manufactured and installed at reasonable cost; and, in my system, the six most needed signal systems (1, ordinary traffic control; 2, fire alarm; 3, police or ambulance alarm; 4, police call; 5, response; and 6, avoidance of collisions) are very economically combined in a unitary organization which makes distinct contributions to the expediting of traffic movements, to the safeguarding of life and property.

Other objects of my invention (including an arrangement of lights for indicating the approximate interval of time that must elapse before an ensuing change in the direction of traffic, means of compensating for any inequality in the operation of motors in different local signal units, means utilizing a stationary drum and a rotating arm in the making and breaking of circuits, means for an automatic shifting of circuit connections when a fire alarm is given, means permitting either a centrally controlled or a locally controlled proportioning of intervals allowed for movements of traffic in two intersecting directions, means for rotating several sets of signal vanes alternately in opposite directions by an application of power from a single motor, means for locking said signal vanes in a non-signalling or "invisible" position during certain hours, means for releasing said locking means, to display "Stop" faces, incidentally to the giving of a fire signal, during such hours, electromagnetic clutch devices provided with automatic throwout and circuit control features, novel details of switchboard chart construction and wiring, and control features appropriate to the unification of all elements above referred to) may be best understood from the following description of an illustrative embodiment of my invention, taken in connection with the appended claims and the accompanying drawings, in which Fig. 1 is one face of a local signal unit, such as may be installed either at the center of an intersection or at two or four of the corners of an intersection. Each signal unit may be assumed, in either case, to have four substantially identical faces; but the indications of these faces, at any given moment, may be unlike.

Fig. 3 is a partial side elevational interior view, taken substantially as indicated by the arrow 3 of Fig. 2, and showing means whereby contacts are successively made and broken incidentally to the rotation of an arm relatively to a stationary drum.

Fig. 4 is a partial vertical section, taken substantially as indicated by the line 4—4 of Fig. 3.

Figure 2:
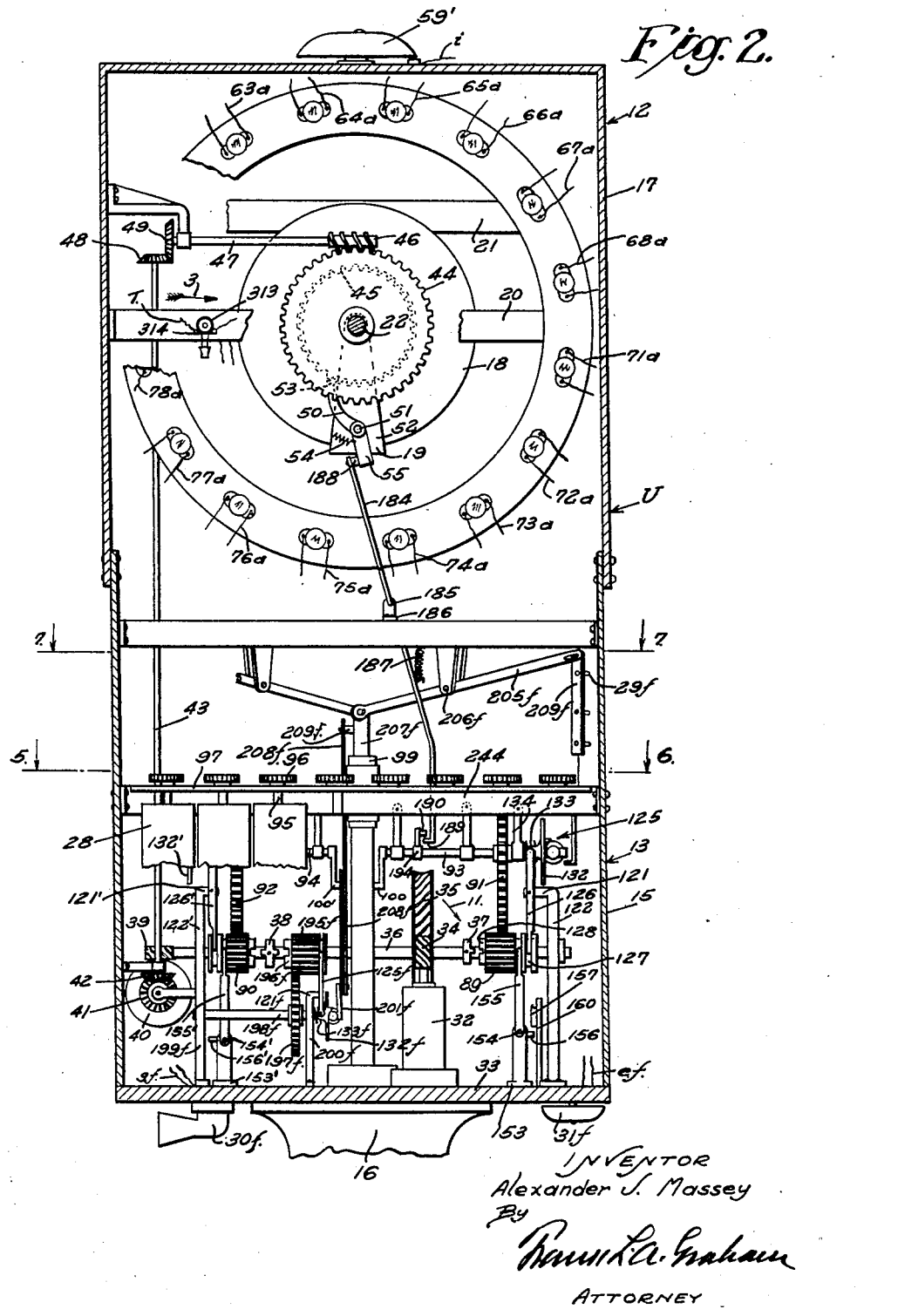
Fig. 2 is a view corresponding to Fig. 1, but enlarged and with parts omitted or broken away.
Figure 5:
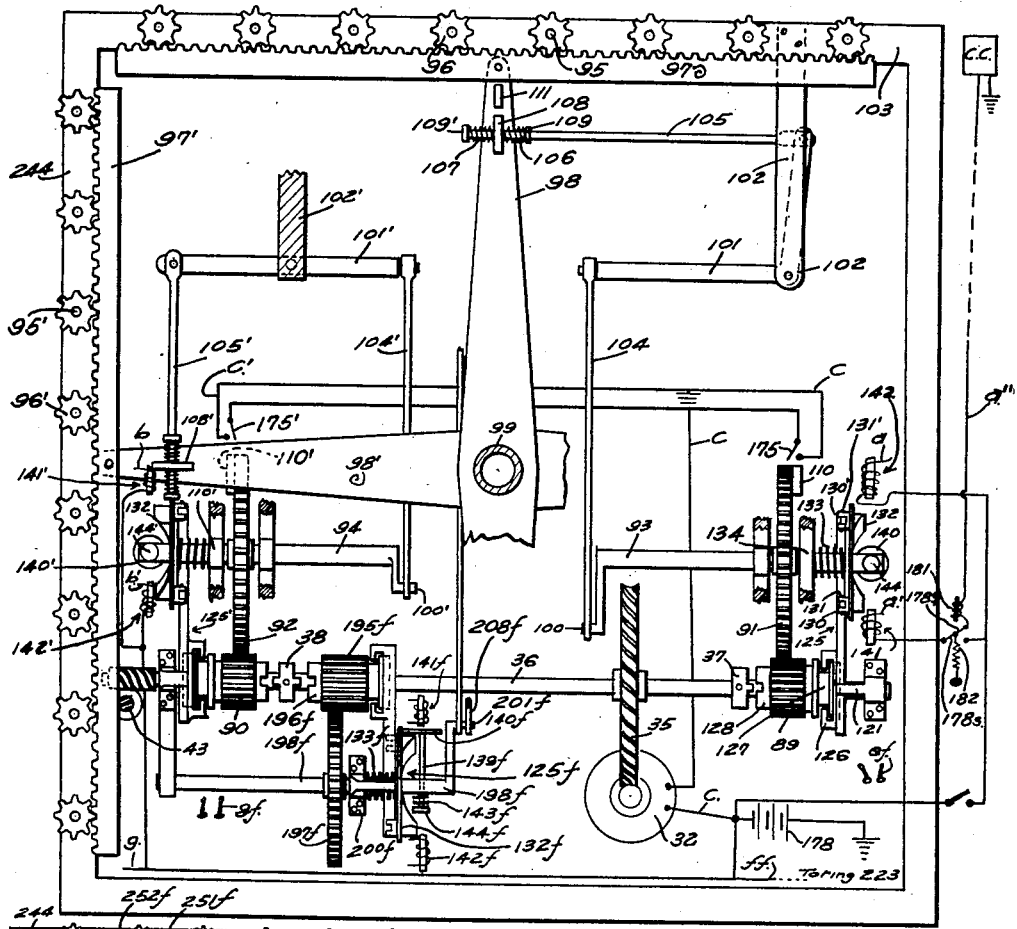

Fig. 5 is a diagrammatic horizontal section, taken in substantially the plane indicated by the line 5—6 of Fig. 2 (but with parts omitted or broken away) showing mechanical trains including gears and levers for the rotation of vanes, and electro-magnetic means as employed in the shifting of clutches, to control the operation of separate sets (as four sets) of vertical vanes used in ordinary traffic control. Some preferred details as to wiring connection are indicated in this figure.

Figure 6:
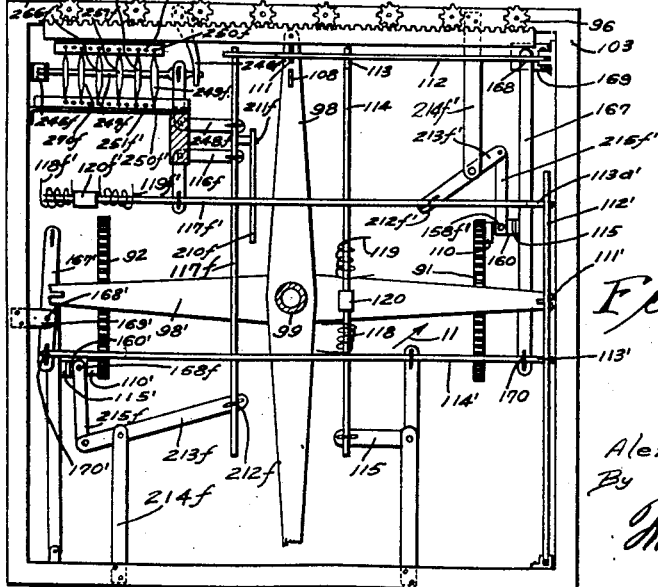

Fig. 6 is a horizontal section, also taken in substantially the line 5—6 of Fig. 2, with other parts omitted or broken away, this view showing, on a smaller scale, preferred means, subject to remote control and comprising electro-magnets, for locking vanes in a non-signalling or neutral position, means for unlocking the same, means for a special control and change of electrical connections in case of fire, and incidentally operated means for stopping or releasing gears in a vane-operating train.

Fig. 7 is a diagrammatic horizontal section, taken substantially in the plane indicated by the line 7—7 of Fig. 2, and showing a type of mechanism preferred for use in operating four sets of fire signal vanes. As best indicated in Figs. 1 and 2, these fire signal vanes may be disposed at an intermediate level, below a stationary drum provided with contacts engageable by a revoluble arm but above sets of traffic-control vanes.

Figure 8:
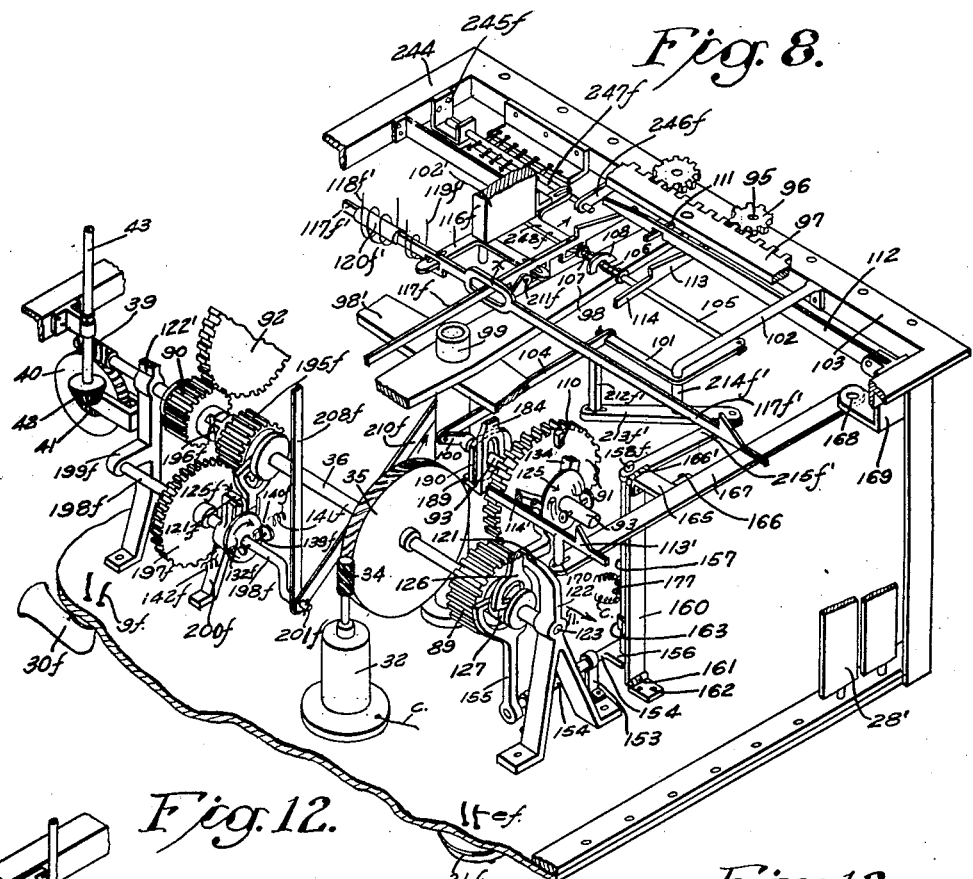

Fig. 8 is a diagrammatic perspective, with parts broken away or omitted, showing in their assembled relationship certain features of construction which are illustrated also in preceding figures.

Fig. 9 is essentially a wiring diagram disclosing additional features as hereinafter described,— including routing charts constituting switchboards and suitable for use at separate central stations, the police station switchboard being provided with lights whose extinguishment indicates the attention of local officers.

Figs. 10 and 11 are respectively diagrammatic perspective detail views of clutch and switch organizations, the positional and functional relationships thereof being hereinafter described.

Figures 12, 13:
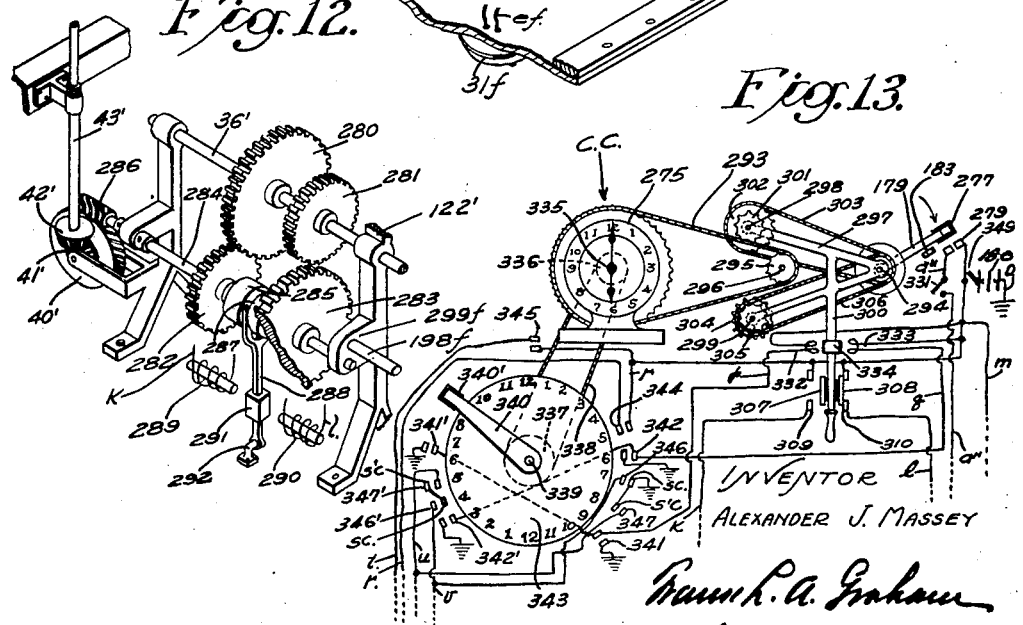

Fig. 12 is a fragmentary perspective view corresponding to a lower left hand portion of Fig. 8, but showing a transmission which includes an electro-magnetically controlled gear shift, to provide additional means for varying, from a central station, the intervals allowed for complete cycles of changes in traffic signal faces.

Fig. 13 is a diagrammatic view of automatic timing and synchronizing means suitable for a central station and including features suitable for use in conjunction with a local gear shift of the general character illustrated in Fig. 12.

Fig. 14 is a diagrammatic view of a street intersection equipped with four signal units, one being a master signal unit, as hereinafter described.

*Main features of the several units*

Referring to the details of that specific embodiment of my invention chosen for purposes of illustration (all figures being somewhat diagrammatic and some parts being distorted, to show the same more clearly) U may refer generally to a local signal unit; and each such unit may comprise an upper section 12, serving a variety of uses hereinafter mentioned, an intermediate section 13, displaying a fire signal, which may comprise horizontal vanes, and a lower special traffic section 14,—shown as comprising vanes which are movable upon vertical axes; and it should be understood that all four of the faces of each signal unit, assuming the same to be rectangular in cross-sectional outline, may be similarly equipped.

In Figs. 1 and 2 I show a local unit U as comprising a lower housing or frame 15, said lower housing being adapted for suspension, as by straps S, or for support upon a post 16 and surmounted by an upper frame or housing 17. The lower housing may enclose mechanism for operating both "traffic" vanes and "fire" vanes, and the upper housing is adapted to display a number of separate lights, for indicating purposes hereinafter mentioned, and is adapted also to support and house a stationary drum 18, which is provided with a comparatively large number of separate contact elements through which circuits may be completed, for the control of signals and operating parts (in a manner hereinafter described) incidentally to the rotation of a contact-carrying arm 19 at a predetermined rate or rates.

The stationary drum 18, or its equivalent, may be supported in any suitable way, as by means of transverse bars 20 and 21. These are shown as secured to the upper frame or housing 17 and as also secured respectively to an end of a stationary shaft 22, which is concentric with said drum, and to the inner face of said drum; and any suitable means may be provided to impart practically continuous rotation to the contact arm 19, causing the same to sweep over corresponding contacts on said drum. The arm 19 is shown in Fig. 3 as carried by a bearing collar which is rotatable on shaft 22, and as provided with means to make and break circuits for signal lights and for vane timing means, and for other purposes hereinafter mentioned.

I consider it advantageous to provide each face of the upper section of my signal units not only with a substantially central red light 23f, to indicate "Fire", but with an upper blue or other colored light 24, indicating "Go", a lower red light 25, indicating "Stop" and also with special lateral lights, as a purple light 26 and a white light 27 respectively indicating "Police or ambulance vehicle" and "Police officer called"; and connections for some or all of these lights, and also connections for the operation of vanes 28, 28' (for ordinary traffic regulation) and independent or correlated connections for audible signals (such as a siren 30f and a "fire" gong 31f), whose preferred users are hereinafter described, may be controlled (subject to further regulations as hereinafter described) by the rotation of the mentioned contact arm 19, relatively to the mentioned drum.

*The rotating contact arm and its drive*

Mechanical and electro-mechanical driving and controlling and locking and releasing devices of any preferred character may be housed within the lower section 14 of each signal unit. For example, a motor 32 may be so positioned therein, as by securing the same to a base plate 33, that a worm 34, driven thereby, constantly rotates, during daylight hours, a worm gear 35 on a shaft 36; and this shaft may carry not only "fixed" clutch elements 37 and 38 (for purposes hereinafter indicated) but also means, such as a terminal worm 39, for driving a worm gear 40 and thereby (through beveled gears 41 and 42) a shaft 43. The latter is shown as extending upward to a level suitable to a transmission of rotary motion to the contact arm 19 or its equivalent, in order repeatedly to make and break circuits, in the general manner indicated, during daylight or "busy" hours.

For the purpose last referred to, using, for example, a worm gear 44, movable with or independently of an ordinary gear 45, and mounting these gears for free rotation upon the fixed shaft 22, I may transmit motion to gear 44, from the upwardly extending shaft 43, by means such as a worm 46, engaging said worm gear 44 (the inter-position of a short shaft 47 and beveled gears 48 and 49 being entirely a question of convenience); and, in order to advance the arm 19 with the gear 45, although permitting compensatory or equalizing interruptions, in a manner hereinafter suggested, the arm 19, or its equivalent, may be releasably connected with the gear 45, or its equivalent, by means such as a dog 50. This dog is shown as pivoted at 51 to a radial portion 52 of the contact arm 19 and as comprising a detent 53. This detent is normally held in engagement with the gear 45 by means such as a spring 54,—which may extend between the mentioned radial portion of arm 19 and the substantially parallel radial arm 55 of said dog.

*The stationary contact drum and its adjustability*

The drum 18 being stationary, it is not difficult to bring conductive wires thereto, by way of its interior, to provide for the making and breaking of the mentioned connections, and others, incidentally to the rotation of the arm 19, or its equivalent; and I prefer to so construct this drum as to secure certain special results, including the provision of simple and effective means, subject to either remote or local control, for varying the intervals allowed for movements of two intersecting streams of traffic. For example, as best shown in Figs. 3 and 4, the drum 18 may comprise slats 56, extending substantially parallel with the shaft 22 and spaced therefrom, as by wheel-like spiders 57. These slats may so interfit with said spiders as to be capable of circumferential sliding movements, although incapable of longitudinal movement thereon; and they may be formed of insulating material. One or two of these slats (as the adjacent slats 56a and 56b) may be rigidly secured to the respective spiders; and these and all of the remaining slats may be interconnected by resilient means, such as tension bands or springs 58, 58',—which, instead of surrounding the same, may be disposed at and secured to the ends thereof as by pins 59.

The lapse-indicating lights in semi-circles

It will be noted that I show, in Fig. 1, the mentioned lights 23–27 inclusive, of the respective upper sections of my signal units (all four faces thereof being similarly equipped) as surrounded by groups of additional lights disposed respectively in an upper semi-circle and in a lower semi-circle,—the lights of the upper semi-circle being preferably of substantially the same color as the larger "Go" signal light 24, and those of the lower semi-circle being of substantially the same color as the "Stop" signal light 25; and these semi-circles of lights are intended to be used in indicating about what intervals must elapse before the respective signal vanes will change their indications as to permissible traffic movements,—the intervals allowed to the respective streams of traffic being variable, within limits, by means comprising the resiliently connected slats above employed.

Assuming, for example, that the rotation of a movable member, such as the arm 19, is to correspond with a complete cycle of normal signalling operations, and that the respective blue lights 61–68 inclusive, are interposed in circuits 61a–68a inclusive, which include contacts 1 to 8 on drum 18 (the contact 1 being formed from a single conductive member, the contact 2 being formed by an overlapping of two conductive members, secured to separate slats, the contact 3 being formed by an overlapping of three such conductive members, etc.) a similar set of contacts being provided on the opposite set of slats 56' (to complete circuits through red lights 71–78 inclusive, of the lower or "Stop" semi-circle) it will be obvious that any variation in the spacing of the respective semi-cylinders of parallel slats is effective correspondingly and progressively to change the intervals of time allowed respectively for one stream of traffic, as compared with the intersecting stream.

To vary the slats I may use means such as a pivot bracket 79, slidable in an arc but connected (as by bolts or rivets 80 and 81) with two slats (as 56c and 56d) which normally lie practically opposite the mentioned fixed slats 56a and 56b; and sliding motion may be imparted to the bracket 79 and consequently the slats by any suitable adjusting means, such as a rod 82, which is shown as pivoted thereto at 83 thereby varying the position of the slats relative to fixed slats 56a and 56b. When movement is to be imparted to the rod 82 from a central or local point, electro-magnetic means such as a plurality of solenoids 84, 84', 85 and 85', having analogous effects upon an armature 86 upon said rod, may be employed to effect any desired adjustment thereof; or a local handle 87 may be used,—the rod 82 being yieldably held, in any adjusted position, by means such as a leaf spring 88, or its equivalent, and alternative switches sl, sc, (s'l and s'c) for the solenoids being located at any convenient point or points.

The larger traffic signal lights 24 ("Go") and 25 ("Stop") and other signal devices mentioned may be energized harmoniously with the lapse-indicating lights 61—68 and 71—78, or their equivalents (the latter being interposed in circuits 71a–78a inclusive) by means of additional contacts more particularly described hereinafter; and the signal vanes 28, collectively displaying on one side the word "Stop" and on the other side the word "Go", may be operated, under general control from a central station, by any suitable mechanical devices, deriving power from, for example, the motor 32,—which may be energized by current from any local source, upon, for example, the closing of a switch hereinafter described as subject to central control.

The "Stop" and "Go" traffic signals

As best shown in Figs. 2 and 8 (all figures herein being somewhat diagrammatic), assuming continuous rotation (during daylight hours) of the mentioned shaft 36, this shaft may be provided not only with the mentioned "fixed" clutch elements 37 and 38 but with a plurality of slidable cooperating clutch elements including gears 89 and 90, respectively provided with clutch faces adapted to interfit with the respective "fixed" clutch elements 37 and 38; and these slidable gears 89 and 90 may respectively be in constant mesh with additional gears 91 and 92, keyed onto separate shafts 93 and 94, for use respectively in transmitting motion to sets of vanes 28 and 28' on the various sides of the lower sections 14 of my signal units,—it being understood that, in the routine regulation of traffic, the vanes (as 28) upon two opposite sides will be changed to "Go" shortly after the vanes (as 28') upon the interposed opposite sides indicate "Stop" and vice versa.

Transmission of motion thereto

For the purpose last referred to, assuming each of the vanes 28, 28' to be mounted upon or integral with a substantially vertical shaft 95, 95' (Fig. 5) one end of which, as the upper end, is provided with a gear 96, sets of gears and controlling vanes upon two opposite faces may be simultaneously rotated by means such as racks 97, 97' disposed upon opposite ends of separately movable levers 98, 98', shown as crossing one another in their central regions and as rotatable upon a central post 99,—which may be fixed to the mentioned bottom plate 33; and movement may be imparted to these levers (98 and 98') by any preferred system of links and levers extending between the same and cranks 100 and 100' on the respective shafts 93 and 94. For example, I may provide levers such as are shown at 101, 101' as pivoted for movement in a substantially horizontal plane (supporting brackets or posts 102, 102' being shown as dependent from frame elements such as angle irons 103,—in which the shafts 95 of the vanes 28 may be pivoted and on which the racks 97, 97' may be slidable). I may connect the selected ends of the levers 101, 101', as by means of rods or links 104 (and 104') and 105 (and 105'), respectively with the cranks 100 (and 100') and with the levers 98 (and 98'),—and in order to avoid the necessity for an excessively precise adjustment of the dimensions of the respective links and levers mentioned, I may connect the rods 105 and 105', or their equivalents, with the respective rack-reciprocating levers 98, 98' by resilient means of the general character illustrated in Figs. 5 and 8 as comprising pairs of compression springs 106 and 107. These are shown as disposed on opposite sides of apertured lugs 108, 108' through which the rods 105 and 105' extend,—one or more adjustable stops 109 and 109' being preferably provided on each rod 105, 105', in order to facilitate such a tensioning of the mentioned springs as is favorable to light operation and to the rotation of the vanes 28 through exactly 180°, backward and forward (to display alternately "Stop" and "Go" faces thereof) as a result of movement of the cranks 100 and 101, in turn, through corresponding angles.

I defer, for the moment, the description of my preferred clutch means for imparting longitudinal movement to the respective clutch gears 89 and 90, through which the mentioned vane-rotating movements are effected; but I may mention at this point that my preferred means for traversing the clutch gears 89 and 90 upon the shaft 36 (assumed to be constantly rotated during daylight hours) may be partly electro-magnetic; and that the gears 91 and 92 are intended to be provided with projections or arms 110, 110', serving not only promptly to stop the rotation of the same (thereby checking the vanes 28 in any position to which they may have been moved by the means described) but also to operate certain switches, associated with some of the mentioned clutches in a manner hereinafter described; and the levers 98, 98' are intended to be provided with special means for locking the same against reciprocation in the indicated manner under certain conditions,—the locking means referred to being subject to remote control and such as to hold the vanes 28 in an intermediate and substantially invisible position during low traffic hours, as during the night, although permitting their release and rotation to a "Stop" position in case of, for example, a fire during the night.

Traffic signal vane-locking and releasing means

For the purpose of holding the levers 98 and 98' against reciprocation, and to hold the vanes 28, 28' in an intermediate and substantially invisible position, I may employ means of the general character best shown in Figs. 5, 6 and 8. That is to say, I may provide each of the levers 98, 98' with an upstanding projection 111 (111') engageable by a latch member 112 (112'); and these latch members, even if each is movable by gravity into a position of engagement, may be normally held from engagement by means such as cams 113 (113') on cam rods 114 (114'), extending therebelow. When these rods are disposed in the same plane, one of them may be movable through a slot in the other, in the general manner indicated (in connection with other rods) at X in Fig. 8; and the two cam rods intended for simultaneous movement, as by means of e'ectro-magnets, may be interconnected by means such as bell crank levers of the general character illustrated at 115 in Fig. 6, (and also at 116f in Figs. 6 and 8,—the latter bell crank lever being employed in the manipulation of cam rods 117f and 117f' utilized to lift the latch members 112 and 112' in case of a fire alarm, as hereinafter described). To manipulate either of the described systems of latch-lifting cam rods, I may employ means such as oppositely tending electro-magnets. These may be of the general character shown diagrammatically at 118 and 119, Fig. 6, the first mentioned electro-magnet being adapted, by action upon an armature 120 upon the cam rod 114 to retract said cam rod, thereby permitting latches 112 and 112' to fall (to catch and hold the lever 98) and the electro-magnet 119 being suitable for an opposite or vane-releasing effect.

Routine interruption of vane-shifting transmission

Assuming an energizing of the electro-magnet 119, or its equivalent, throwing the cam rods 114, 114', inwardly, to be utilized to lift, as at the beginning of a traffic-control day, the latches 112, 112', from engagement with the upstanding projections 111, 111', so that the arms 98, 98' are free to be reciprocated laterally, by means of the general character described, any preferred clutch means may be employed intermittently to connect and disconnect the gears 91 and 92, whereby the cranks 100 and 100', and thereby the arms 98, 98', are moved. It will be understood that periods of rest, which may be of forty seconds' duration, more or less, are intended to intervene between the brief periods during which the vanes 28, 28' (displaying the words "Stop" and "Go") are shifted; and for the purpose of producing the intermediate shifting effects just referred to, I may employ means of the general character best shown in Figs. 2, (3), 5, 8 and 10.

The cam-operated clutches

On any suitable support, such as an arm 121, which may extend inwardly from a post 122, providing at 123 a bearing for the main shaft 36, I may pivot, as at 124, a clutch organization 125. The gear-shifting fork 126 of this clutch organization is shown as engaging a groove 127 in a slidable clutch element comprising the gear 89 which is provided at 128 with a clutch face adapted to interfit with a complemental face upon the fixed clutch element 37 on shaft 36; and an oppositely (upwardly) extending arm 129 of the mentioned clutch organization is shown as constituting a second fork, whose fingers 130 and 130' (Fig. 5) are pivotally connected (by pins 131, 131') with a cam disk 132, through which the shaft 93, carrying the gear 91 and the crank 100 loosely extends. The cam disk 132, or its equivalent, may be constantly pressed outward by means such as a compression spring 133, shown as interposed between said disk and a bearing bracket 134 and tending to effect an engagement of the mentioned clutch elements; and the outer face of the disk 132 is shown as provided with inclined arcuate cam surfaces or prominences 135 and 135', projecting laterally therefrom and terminating in abrupt faces 136, 137,—a circumferential area 138 being provided at the extreme periphery of the disk 132, for a purpose hereinafter indicated.

Electro-magnetic control thereof

It will be noted that the prominences 135, 135' are shown as spaced about 180° apart; and the highest portions thereof may be disposed in a substantially horizontal line, passing through the shaft 93; and through this shaft I may insert a horizontally slidable rod 139, carrying at one end an enlargement 140,—which may serve not only as a cam roller adapted to ride up on the inclined surfaces 135, 135', (thereby pressing the disk 132 inward, and disengaging the described clutch) but also as an armature, movable, as in either of two opposite horizontal directions, by means such as electro-magnets 141 and 142 respectively inserted in circuits or branches a' and a. On what I may term the inner end of the transversely slidable rod 139 I may provide means such as a compression spring 143 (shown as retained by an outer head or stop 144, and as limited, in its effect, by an inner stop or collar 145) tending constantly to draw the cam roller 140 into an inner position, in which it is effective repeatedly to shift the clutch fork 136 in the general manner described. During daylight hours, although all timing might be done mechanically, so that neither of the electromagnets 141 and 142 need be energized, and although either or both of said electromagnets may be locally energized, I prefer to energize at least one of said electromagnets from a central station. Thus, whenever the clutch fork 126 has been so moved as to effect a disconnection of the described drive, and a consequent stopping of the shaft 93, a lateral movement of the cam roller 140, causing the same to drop onto the area 138 in response to an energizing of one or the other of the mentioned electromagnets (141 and 142, or their equivalents) may be relied upon to permit the spring 133, or its equivalent, to move the disk 132 outward, thereby shifting the clutch gear 89, or its equivalent, again into an engaging position and initiating a further movement of the gear 91, keyed onto the shaft 93. After passing out of reach of that electromagnet by which it may have been laterally shifted, the cam roller 140 is automatically moved inward, under the force of the compression spring 143, or its equivalent, so as to produce a repetition of the described movements of the clutch organization 125; and it will be obvious that the time intervals between the successive half-revolutions of the gear 91 (and also the corresponding half-revolutions of the crank 100, and thereby the corresponding half-revolutions of the vanes 28, or 28') may thus be rendered dependent upon the intervals between the successive energizations of clutch-shifting electromagnets 141 and 142, or their equivalents; and one or both of these energizations may be controlled directly from a remote point or by the rotation of the arm 19 relatively to the drum 18,—as by engagement of suitably spaced "fixed" contact pairs 147—7' and 146—6' on said drum (see Figs. 3 and 9— these pairs being respectively included in circuits or branches $a'$, and $a$, which respectively comprise the electro-magnets 141 and 142) by a bridging contact piece 148 on rotating arm 19.

*Drum control and overlap of stop periods*

It should be understood that the shaft 94 (see Fig. 5) carrying gear 92, to rotate the crank 100' (and thereby the vanes 28' on what may be referred to, for convenience, as the east-and-west faces of a single unit U) may be controlled by an entirely similar clutch organization 125' (to some of whose parts corresponding primed numerals are applied) timing control thereof being similarly effected,—as by engagements between a corresponding contact piece 149 on the arm 19 and "fixed" contact pairs 150—0' and 151—1' on the drum 18.

The so-called "fixed" contacts above referred to may of course be secured either to the body of the drum 18 or to selected movable slats 56 thereon; and, in either case, they may be circumferentially adjustable relatively to said slats, as by the provision of slots or openings 152 therein; and, as implied above, the circumferential spacing of the respective mentioned contact pairs (146—6' and 147—7', and 150—0' and 151—1' is intended to be such as to cause energization of electromagnet 142 (through contacts 146—6'—to occasion that semi-rotation of the gear 91 which causes, say, the north-and-south-exposed vanes to display "Stop") shortly before the east-and-west-exposed vanes 28' (upon the energization of an electro-magnet 141' through contacts 150—0' in circuit or branch $b'$) are caused to display "Go" faces; and vice versa.

The contacts on drum 181 energize the respective "Go" and "Stop" lights 24, 25 for one street, and the "Go" and "Stop" lights of the cross-street are of the same circumferential extent as the circumferential spacing of the corresponding contacts 147—7' and 146—6' and 150—0' and 151—1' so that a "Go" light 24 is displayed with a "Go" vane signal and "Stop" light 25 is displayed with a "Stop" vane signal.

*Initiating and suspension traffic regulation*

Referring to the mentioned provision of arms or projections 110, 110' on the independently controllable vane-operating gears 91 and 92, and to the use of cam rods 114 and 114', engaging latch elements 112 and 112', whereby the reciprocable arms 98 and 98' may be caught and held in "neutral"; in order that an inward shifting of the mentioned cam rods to a vane-stopping position (as at the end of a traffic-control day) may promptly (1) bring the mentioned gears 91 and 92 to a positive stop, (2) disengage the drive connection to the same, and also (3) break the circuit by which the motor 32 is energized (an opposite movement of said rods having an opposite effect) I may provide, in connection with each of the vane-reciprocating transmission means described, additional stopping and clutch-throwing and circuit-opening means of the general character best shown in Figs. 2, 8 and 11.

That is to say, I may provide, as by mounting the same upon a bracket or brackets 153 (and 153') additional clutch organizations comprising rock shafts 154 and 154'; and prefered details of these additional clutch organizations may be of the general character separately illustrated in Fig. 11. That is to say, each of the mentioned additional clutch organizations (when formed entirely distinct from the described clutch organizations 125 and 125') may comprise, in addition to a rock shaft 154 (or 154'), which may be integral with a fork 155 (or 155'), an inclined or horizontal arm 156 (or 156') so disposed that a depressive or other movement thereof is effective to disengage the clutch face of gear 89 (or 90) from the cooperating clutch 37 (or 38)—these latter being fixed on the shaft 36; and motion may be imparted to the arm 156 (156'), or its equivalent, by means of the general character illustrated in the figure last mentioned—which may be regarded as taken from the general direction indicated by the arrows 11 of Figs. 2, 6 and 8.

In order to so support a slidable bolt 157 that whenever an upper section 158$f$ thereof (shown as pivotally connected by a pin 159$f$) is struck by the lug or projection 110 on gear 91, a depression of the arm 156 shall produce a disengaging movement of the fork 155, or its equivalent, I may secure the same to, for example, an upstanding plate 160. This latter is shown as attached by a pivotal connection at 161 to a bracket 162, which may be secured to the base plate 33; and I may provide, on the plate 160, or its equivalent, fixed guides such as are shown at 163 and 164, adapted to hold the body of said bolt 157 in a parallel relationship with said plate, although permitting a sliding movement thereof in a plane parallel with the inner surface of said plate; and, in order pivotally to move the top of said plate inward, at proper times (as when traffic regulation is to be discontinued during the night)

into such a position as to assure an engagement of the projection or arm 110, upon gear 91, with the upper section 158f of the bolt 157, I may employ means such as an angle bracket 165, shown as secured by an upwardly extending arm 166 to a horizontally extending lever 167 and as pivotally connected at 166' near the upper end of the plate 160.

In order that the described pivotal movement of the plate 160 shall be effected, in an automatic manner, incidentally to the withdrawal of the cam rods 114 and 114' from beneath latching elements 112 and 112', to permit the latter to stop the arms 98, 98', (thereby normally holding the vanes 28, 28' in neutral or non-signaling positions during the night) one end of the lever 167 being shown as pivoted at 168 (Figs. 6 and 8) on a fixed bracket 169, I may secure the free end of said lever, as by a pin and slot connection at 170, to the cam rod 114'; and corresponding movements may be imparted to the additional clutch fork 155' (see Fig. 2 only) by an analogous organization comprising a lever 167', shown as pivoted at 168' on a bracket 169', said lever 167' being shown as pivotally connected at 170' to the same cam rod 114', and corresponding primed numerals being applied to analogous parts, so far as shown.

By the use of a construction of the general character described, it will be obvious that an inward movement of the levers 167 and 167' may be relied upon to bring the upper end of the pivoted sections 158f, 158f' of bolts 157 and 157' directly into the paths of the arms or projections 110 and 110', thereby bringing the gears 91 and 92 successively to a complete stop incidentally to the shifting of the clutch gears 89 and 90 by means of the forks 155 and 155'; and an opposite movement of the levers 167 and 167', as at the beginning of a traffic-control day, may be similarly effective to withdraw the bolts 157 and 157' from the paths of the arms or projections 110 and 110', to permit the routine operation of my traffic signal organization in the general manner above described. Means such as a tension spring 171, shown as extending between a lateral projection 172 (serving as a crank on arm 156) and an arm 173 projecting from plate 160 may be employed normally to press the fork 155 in a clutch-engaging direction and to hold the arm 156 and the bolt 157 normally in elevated positions; but the power of the spring 133, tending to move the fork 126 of the clutch organization 125 into a clutch-engaging position, and the power of the last-mentioned spring 171, when both of these springs are employed, should be so related that neither spring interferes with the effect of the other. In this connection, it will be noted that both of the springs here referred to tend to move the mentioned clutch gears in the same direction, and accordingly, if desired, either spring may optionally be exclusively relied upon, if sufficiently powerful.

In order that a contact between the arm or projection 110 and/or 110' and the pivoted bolt section 158f and/or 158f' may be incidentally effective also to break parallel branches of a circuit C, by either of which the motor 32 may be energized, I show a mentioned fixed guide 164 as provided with an extension 174, carrying a "fixed" contact 175, and I show the bolt 157 as carrying a corresponding arm 176 provided with a cooperating movable contact 177,—the relationship between these contacts being such that depression of the bolt 157 breaks the main circuit C,—energized by any suitable local or other source of current 178. It will be appreciated that, the energizing of the electromagnets 118 and 119, by which the cam rods 114 and 114' are shifted, being subject to daily central or other remote control, the described inter-relationship between the movements of the mentioned cam rollers and the breaking of the circuit by which the motor 32 is energized makes possible a centralized control of a traffic-signalling organization in which local sources of energy are relied upon for the shifting of signal vanes; and, if desired, the operation of these vanes may be further synchronized by means such as I will next describe. When separate cam rods 117f and 117f' are provided (for the release of latches 112 and 112' in case of fire at night, as hereinafter described) a rod-retracting electromagnet 118f', shown as adapted to attract an armature 120f' on rod 117f', may be used analogously to the rod-retracting electromagnet 118; and a rod-advancing electromagnet 119f' may be used analogously to the rod-advancing electromagnet 119, shown in Fig. 6 as surrounding rod 114; and all of the mentioned cam rods may be slidably supported for manipulation as above or as hereinafter described.

*Synchronization of signals*

Without entering, at this point, into a complete description of my preferred wiring system, I call attention to the practicability and advantages of including within a circuit whose energization is subject to a central control, one of the electromagnets (141, 142, 141', 142') by which the mentioned cam rollers 140 and 140' are laterally shifted,—preferably subject to a partial predetermination of time intervals, as described, by the circumferential spacing of the mentioned "fixed" contact pairs on stationary drum 18.

It is a matter of common observation that even electric motors whose parts are carefully standardized with a view to the operating of their rotors at substantially the same R. P. M. do not run exactly alike—their actual performances depending upon many obscure factors; and since the rates at which the arms 19', in different units U, rotate during daylight hours are dependent upon the performances of the respective motors 32 therein (and optionally energized from different local sources of energy) I advocate the employment of means whereby successive cycles of the described signalling operations (each of which cycles may be regarded as including (1) a north-and-south "Go" period, (2) a first brief all-stop period, (3) an east-and-west "Go" period, and (4) a second brief all-stop period) may be synchronously initiated throughout any desired number of local units U, and regardless of local variations in the fractionating of a complete cycle interval assumed to be of uniform total duration.

For example, assuming that the energization of the electromagnets 142, 141', and 142', respectively included in circuits a and b and b' (and serving respectively to occasion display of a "Stop" face by vanes 28, and a "Go" face and then a "Stop" face by vanes 28') are respectively dependent upon the bridging of contact pairs 146—6", 159—0' and 151—1' by contacts 148 and 149, I may provide, somewhat as indicated in Fig. 5 and in the wiring diagram constituting Fig. 9, means whereby an energization of the electromagnet 141 (mentioned as included in a circuit or branch a' containing contact pair 147—7') may be alternatively energized (as upon the throwing of a switch 178s) at predetermined regular intervals, as by a device CC of central control. This device may comprise (Fig. 13) a clock or other motor provided with an arm 179 carrying a bridging contact repeatedly into engagement with a contact pair, interposed in branch or circuit a'',—which may be common to any desired number of signal units U. The arm 179, or its equivalent, may reciprocate or advance at a rate such as, for example, one revolution or reciprocation in (say) eighty seconds; and, if desired, current supplied by a circuit D from a source 180 to the circuit a'' may pass also through additional local electromagnets 181, adapted to shift local switches 178s in opposition to springs 182,—this construction being effective (see Figs. 5 and 9) to render the central synchronizing control dominant whenever the arm 179 is permitted to rotate (as by the withdrawal of a stop bolt 183) although permitting an automatic return to local control by mentioned means in branch a' whenever central control is discontinued.

As suggested in Figs. 5 and 9, three of the mentioned electromagnet branches (as, the branches a, b and b') may be connected with the mentioned local circuit C; and, by employing the described arrangement, or its equivalent, in conjunction with suitable additional devices, I may be sure that even through the various electromagnets (say) 142 and/or the electromagnets 141', and/or the electromagnets 142' in different signal units U, happen to be energized at different instants, nevertheless, the energization of the remaining clutch-operating electromagnets (141)—which may be referred to as initiating the new cycles of routine traffic-regulating signaling operations—may be so closely synchronized as to assure consistent operation throughout any desired portion of a city.

In order to check the arms 19 in those signals U whose motors tend to run somewhat too fast (none being tolerated that run slower than a predetermined rate, consistent with the rate of reciprocation or rotation of the arm 179, or its equivalent) I may employ momentarily operating automatic disconnecting means of the general character best shown in Fig. 2. That is to say, I may provide a substantially vertical or inclined rod 184, which may extend through a guide opening or openings 185 in a bracket or brackets 186 connected with a transverse element of the described main frame, with resilient elevating means such as a tension spring 187 and with an upper terminal portion controlling or including a stop 188, normally projecting into the path of the mentioned arm 55 of the dog 50,—by which the gears 44 and 45 are ordinarily so interconnected as to rotate together; and the lower end of this rod 184 may be provided with a laterally extending or inclined arm 189 so engageable by a crank or cam projection 190 on the mentioned shaft 93 (carrying also crank 100, for the rotation of vanes 28) that rotation of said shaft is effective to draw said rod momentarily downward,—until the projection 190 passes out of engagement with the arm 189. By this or equivalent means, assuming that the arm 19 has been rotated at such a rate that it would make a complete revolution in less than the intended period (as, in seventy-eight seconds rather than the intended eighty seconds assumed) the interposition of the stop 188, or its equivalent, in the path of the arm 55, effecting a momentary disconnection of the drive of the arm 19, may cause said arm to hesitate in its rotation until—as by reason of the energizing of the electromagnet 141 from a point of central control in substantially the described manner—the shaft 93 is permitted to complete a rotation. In this connection, it will be obvious that the crank or cam 190 may be set (as by means of a screw 194) at any desired angle relatively to the crank 100 (or the crank 100'); and accordingly, although the described arrangement is such as would cause the hesitation (if any) of the arm 19 to occur just in advance of the shifting of the north-and-south exposed vanes 28 to a "Go" position, a hesitation of the described character may be made to occur within any one of, or within each of, the described periods of a complete cycle of sequential operations.

In case of fire at night

To facilitate the distinguishing of parts concerned especially with the giving of a "Fire" signal, such parts may or may not, in actual practice, be painted or otherwise colored red. As a matter of convenience in representing the same in the accompanying drawings, they are not so shaded but are, in general, designated by characters terminating with the letter "f". In Figs. 2, 5 and 8, I show the continuously driven main shaft 36 as carrying, in addition to the mentioned longitudinally slidable gears 89 and 90, provided with clutch faces, also an additional gear 195f having a clutch face 196f,—adapted to cooperate with a second clutch face upon the "fixed" clutch element 38, on said shaft; and this gear 195f may be in constant mesh with an outer gear 197f upon a short shaft 198f, shown as extending between a bearing arm 199f upon the mentioned post 122' and an additional bearing post 200f. In order to shift the gear 195f between the position of disengagement in which it is shown and a position of engagement in which it is effective to rotate the gear 197f, and thereby a crank 201f, which may be integral with or rigidly secured at the end of the shaft 198f, I may employ a clutch organization entirely similar in principle to the clutch organizations 125 and 125'. That is to say, I may pivot a clutch organization 125f upon a laterally projecting arm 121f at the top of post 200f, and I may interpose a spring 133f between the post 200f and a circular disk 132f in such manner as to press said circular disk constantly outward, thereby tending to shift the gear 195f into a position of engagement; and I may employ means such as electromagnets 141f and 142f (see Fig. 5) to impart lateral movement, in case of fire, to a slidable rod 139f, extending through the shaft 198f and carrying at one end a cam roller 140f,—the opposite or inner end of this rod 139f being shown as provided with a compression spring 143f, retained by a head 144f.

The vanes 29f collectively displaying the word "Fire" may be mounted upon separate horizontal shafts 202f, each shaft being provided with means, such as a crank 203f, (Fig. 7) to impart rotation thereto; and each set of cranks may be interconnected by means such as a substantially vertical rod 204f (Figs. 2 and 7). Simultaneously to impart movement to these substantially vertical rods, in order to shift the vanes 29 to a "Fire" signal-displaying position, I may employ means such as levers 205f, shown as pivoted at 206f and as having at their outer and inner ends respectively pin-and-slot connections with the rods 204f and with a central actuating member 207f,—the latter also being reciprocable in a vertical plane. The central actuating member 207f, shown as slidable within the hollow post 99, may be shifted from a lower to an upper position, or vice versa, by means such as a link or pitman 208f, connected at one end to the mentioned crank 201f, on shaft 198f, and at its other end to an arm 209f on the actuating member 207f,—as best shown in Fig. 2.

Assuming, for example, that a downward movement of the rods 209f is effective to shift the vanes 29 to a "Fire" signal-displaying position, it will be obvious that the rotation of the crank 201f, through a half turn from the position of rest in which it is shown in Fig. 8 (as by an energization of electro-magnet 141f) may have the desired effect; and, in order that the traffic signal vanes, if previously held in a non-signalling position, may be incidentally released long enough to be brought to a "Stop" signalling position, I may utilize the mentioned rotation of crank 201f through a half-turn to impart latch-lifting (outward) movements to the mentioned cam rods 117f, 117f'— as by pivotally connecting an additional link 210f not only with said crank but with one of said cam rods,—as at 211f; and I may also provide these cam rods with means whereby the mentioned pivoted upper sections 158f of the slidable stop bolts 157, 157' may be so moved as to permit a shifting, by clutch organizations 125 and 125', of gears 89 and 90,—to effect the suggested display of "Stop" signals on all sides of the selected units U, along the route which is to be traversed by fire apparatus.

For example, I may (as best shown in Figs. 6 and 8) provide cam rods 117f and 117f' respectively with depending arms 212f and 212f', adapted to impart movement (as by pin-and-slot connections) to levers 213f and 213f'. These levers are shown as respectively pivoted on a rigid arm or bracket 214f, and on an extension 214f' of the mentioned arm or bracket 102 (supporting also lever 101, used in the reciprocation of vanes 28) and as respectively adapted to impart, by links 215 and 215f', limited lateral movements to the upper sections 158f and 158f' of slidable bolts 157f and 157f'—somewhat loosely projecting upward through said links. The mentioned lateral movements of the pivoted bolt sections 158f and 158f' are intended to be such as to shift the same from beneath the arms or projections 110, 110', thereby permitting gears 91 and 92 respectively to make each approximately a quarter turn from such a position as that in which they are illustrated in Fig. 5,—the cam wheels 149 and 149' then riding up on the "Stop" cam faces on discs 132 and 132' (as, the cam face 135' of disc 132, Fig. 10). Use of the last-described means is preferable to the exclusive use of electromagnets 118 and 119; but 119f' (if used) and 141f may be included in one circuit, 118f' (if used) and 142f being in another.

*In case of fire during the day*

It will be appreciated that each red (or blue) lapse-indicating light (61–78 inclusive) is intended to be placed in series or in parallel with a blue (or red) light (61'–78' inclusive, Fig. 9) on an adjacent face of each signal; and the signal light lenses (hooded or not) are intended to be effective even by day; but the stationary drum 18 is shown as carrying, in addition to the mentioned overlapping contacts 1, 2, 3, 4, 5, 6, 7 and 8 referred to as controlling the lapse-indicating lights 61–68 inclusive, in circuits 61a–68a inclusive (there being a corresponding set of contacts for light circuits 71a–78a inclusive, not seen in Fig. 3, because disposed on the non-visible side of drum 18) and in addition to the mentioned clutch-controlling contacts (146—6', 147—7' and 150—0', 151—1') a number of electrically conducting bands or hoops entirely surrounding said drum,—several of these bands being so-called "contact combs", whose lateral projections are adapted to make intermittent contact with cooperating contact members carried by the rotatable arm 19, but designed to become effective only when, as in case of fire or other emergency, certain additional switches are closed.

For example, the fixed drum 18 is shown as carrying what may be referred to as a "comb" contact band 216f, whose lateral projections 217f are adapted to be successively engaged, during each revolution, by a contact 218f on arm 19, intermittently to complete a circuit or branch ef,—whereby the mentioned fire gong 31f, or its equivalent, may be energized; and said drum may carry also similar but less finely serrated "combs" or bands 219f, 219f', engageable by a bridging contact 220f, on arm 19, intermittently to energize a branch or circuit gf, containing the mentioned siren 30f, or its equivalent,—to indicate the route of an ambulance or police vehicle. If a continuous sounding of this siren, by energization from some central source is ordinarily relied upon to indicate the approach of a police or ambulance vehicle, an intermittent energization thereof, produced by a shifting of connections, somewhat as hereinafter described, may be used, at points common to the intended routes of said vehicles and the intended routes of fire apparatus, in case both are out at the same time, to obviate collisions by a warning of the respective drivers, and to notify all persons concerned; and, using a construction such as that just referred to, the arm 19, assuming the same to be conductive and to comprise an insulation section 221, may receive current (from, for example, the mentioned local circuit C, by a wire ff) as by the engagement of a contact 222 with a conducting ring 223. To this conductive ring, or its equivalent, the mentioned wire ff may be so connected that, whenever current is permitted to pass from said arm by way of the contact 218f, the mentioned gong may be caused to operate; and, in order that energization and de-energization of the electromagnets 141f and 142f (Fig. 5) or their equivalents (as from a fire central station) may be effective not only to shift the "fire" vanes 29f and the latch-controlling cam rods 117f and 117f' but to energize the appropriate circuits through contacts 218f and 220f on arm 19, or its equivalent, I may provide means whereby the shifting of said cam rods is automatically effective to operate a special switch organization of any preferred character.

*Automatic shifting of contacts in case of fire*

For example, I may utilize horizontal angle members, such as flanged frame members 244 through which the shafts 95' of traffic signal vanes 28 and 28' are shown as extending, to support, as by brackets 245f and 246f, a slidable contact rod 247f, or its equivalent, carrying any desired bridging or other contact members; and this slidable rod may be operatively connected with, for example, the cam rod 117f, as by means of a bell crank lever 248f,—shown as provided with terminal slots to receive pins extending respectively through said contact rod and said cam rod. Thus, whenever the crank 201f, or its equivalent, is rotated, to operate the fire vanes 29f, etc., through an arc of 180°, more or less, from the position in which it is shown in Fig. 8 (thereby moving the link 210f and the lever 248f respectively in the general direction of arrows shown) the contact rod 247f may be moved (say) toward the left from the position in which it is shown in Figs. 6 and 8; and this movement may be effective automatically to make and break circuits, substantially as shown as in Figs. 6 and 9.

In the Fig. 9, I show the bridging contact 249f as normally maintained in engagement with contacts 250f and 250f' which may be common to circuits or branches a' and b through magnets 141 and 141' (respectively including contact pair 147—7' and 150—0', on drum 18) the bridging of these contacts being effective to permit energization successively of the electromagnets 141; and 141' (by which cam rollers 140 and 140' normally are so moved, intermittently, as to occasion rotation of the vanes 28 and 28' respectively to "Go" signalling positions); and the shifting of the bridging contact 249f in the direction referred to may be effective not only to prevent, for the time being, further automatic operation of the vanes 28, 28', after they are brought to "stop" signalling positions, on all faces, but also to bridge a gap between contacts 151f and 151f', in the (previously incomplete) circuit or branch ef containing "Fire" gong 31f, or its equivalent.

Similarly, assuming that the mentioned lapse-indicating lights, subject to routine control by drum 18 and arm 19, are normally energized by current grounded through a circuit or branch z (which may be connected, through ff and bring 223 with the mentioned local circuit C) the lateral shifting of a bridging contact 252f from engagement with contacts 253f and 253f' in said circuit or branch z may be effective not only to extinguish all said lapse-indicating lights, but also to bridge a gap between contacts 254f and 254f' in a circuit hf, containing the flickering central "fire" light 23f, or its equivalent; and the flickering of this light may be ocassioned by carrying the current of circuit hf through a comb contact 255f, as by means of a contact 256f also provided on arm 19, or its equivalent. The suggested (left hand) movement of the contact rod 247f, or its equivalent, may also be effective to so move bridging contact 257f relatively to fixed contact 258f, 258f' as to close a gap in the mentioned circuit gf, containing siren 30f and light 26,—so that this siren (when energized by engagements of 257f with fixed contacts 259f and 259f') may be intermittently sounded, as it is energized by successive engagements between the teeth of combs 219f and 219f' on the drum 18, and bridging contact 220f on arm 19, or its equivalent. Thus, any sounding of the siren 30f which is intended to be operated continuously from a central station in case a police or ambulance vehicle only is out, is caused to become intermittent (alternating with the flickering "fire" light) in case fire apparatus is also out and is routed past the same intersection.

*Audible and flickering traffic signals*

If the gong 31f is reserved for use in case of fire, an additional audible signal, as for example, a second gong 59', shown in Fig. 1 as positioned on top of the signal unit U, may be operated incidentally to each shifting of the vanes 28, 28'; and the "Go" light 24 and "Stop" light 25 may respectively be made to flicker, incidentally to each extinguishment of one of the described lapse-indicating lights 61—68 and 71—78. For the former purpose, I may, for example, provide on each of those slats 56 which carries one of the stop-signalling contact bars 146—6' and 151—1' (say) a series of conductive plates such as are indicated at 260 and 261, Fig. 3,—each of the slats which carries one of the "Go" contact pairs 147—7' and 150—0' being shown as provided with two of these plates (262, 263); and all of these plates may be, regardless of the adjustment of slats 56, in constant contact with a surrounding conductive band 264. This band may be included in a circuit or branch i, comprising gong 59', or its equivalent, and the mentioned plates may all be engageable by a single contact 265 on arm 19; and the completion of the circuit i, or its equivalent, may also be dependent upon the position of a bridging contact 266f on bar 247f, relatively to contacts 267f and 267f' in circuit i.

The lapse-indicating lights 61—68 and 71—78 being shown as equal in number to the slats 56, carrying contacts 1—8, etc., therefor, in order that the successive extinguishments of said lights shall be accompanied by a flickering of the lights 24 or the lights 25, I may provide, on the drum 18, additional fixed contacts 268 (and like contacts, not seen) engageable by a contact 269; and the completion of branches or circuits j, j', including said contacts, may be dependent upon the position of additional bridging contacts 270f and 271f on rod 247f relatively to fixed contacts 272f and 272f' in circuit or branch j and fixed contacts 273f and 273f' in circuit or branch j'.

*Résumé of drum contacts and operation*

The overlapping or composite contacts shown in Fig. 3 at 1—8 inclusive (and a corresponding set, not seen) may be engageable by contacts 274 controlling the mentioned circuits 61a—68a and 71a—78a of the lapse-indicating lights; and I have pointed out that the separate contacts 268 (and like contacts not seen) are adapted to complete circuits j and j' containing respectively the colored "Go" and "Stop" lights, and to cause the same to flicker, as each lapse-indicating light goes out; also that the "comb" contact 216f, comprising teeth 217f is adapted (upon the shifting of the rod 247f, to bridge another gap in circuit ef in case of fire) to complete intermittently a circuit through fire gong 31f; that the somewhat coarser "comb" 255f is adapted, under the same circumstances, to complete, with different intermissions, the circuit hf, through the central flickering red "fire" light 23f; that the similar but oppositely cut coarse comb 219f, 219f' are adapted (in case the route of a police or ambulance vehicle, simultaneously out, intersects that of fire apparatus) to cause, by a closing of branch gf the police or ambulance vehicle siren 30f (sounding continuously at non-intersecting route points thereof) to sound intermittently in the intervals between operations of the fire gong 31f, at intersecting points; that the ring 223 is adapted to bring current to the arm 19, for distribution to the mentioned contacts thereon and through plates 260—263; that said plates and band 264, cooperating with a contact 265, in circuit i, may normally occasion timed energizations of the signalling gong 59' (synchronized with the movements of the vanes 28, 28', as occasioned by the engagements of spaced contact pairs 146—6', etc., by insulated bridging contacts 148, 149; and it will be seen that, by the use of coordinating features of the general character described, I can, in case of fire, accomplish, automatically and incidentally to the bringing of the fire vanes into signalling positions, not only an illumination of the red "Fire" signals and a sounding of the fire gong and a shifting of all traffic vanes to "Stop" positions but a discontinuance, with the disconnection of lapse-indicating lights, of those traffic gongs and flickering effects normally incidental to the routine regulation of traffic; and these effects are so produced as to permit also the accomplishment of the described special signal effects, to warn drivers of fire apparatus and police or ambulance vehicles, respectively, in case the routes thereof intersect.

*Central control of traffic cycle total periods*

It has been indicated both that a complete cycle of routine traffic signalling operations is intended to correspond in duration with the period required for a complete revolution of arm 19 relatively to drum 18, and that central station means may, if desired, be employed to synchronize the rotative movements of the arm 19 of all signal units installed throughout an entire district or city; and, if desired, I may provide, partly within each unit and partly at the central station, means whereby the rate of rotation of the arm 19 may be varied at a particular point, or throughout the entire district or city,—a cycle period of (say) 80 seconds being maintained during certain hours (as, for example, up to 4:30 in the afternoon) and a shorter period (as, for example, a 60-second cycle period) being maintained thereafter up to (say) 7 o'clock.

For example, assuming that the energization of the electromagnets 141, in circuits or branches a', is relied upon to bring the vanes 28 to a "Go" position (upon the engagement of bridging contact 178s with contact pair 147—7' in circuit or branch a') I may employ means such as a clock 275 (see Fig. 13) at a central station, and intermediate mechanism rotating arm 179, carrying a bridging contact 277, to complete a circuit from any suitable source 180 through a contact pair 279,—to energize the mentioned circuit or branch a'' at predetermined intervals; and, in order harmoniously to change the rate of rotation of the clock-driven arm 179, or its equivalent, and the rotation of the arms 19, in local units at various intersections, I may employ means of the general character illustrated in Figs. 12 and 13.

In Fig. 12, I show a horizontal shaft 36' (comparable with the shaft 36 of Fig. 8) as adapted to drive a substantially vertical shaft 43' (comparable with the shaft 43) by alternative means comprising a large gear 280 and a small gear 281, respectively mounted on shaft 36' and adapted alternatively to be engaged by either a small gear 282 or a large gear 283 on a shaft 284,—disposed parallel with the shaft 36' and provided with both a slidable clutch element 285 and a terminal worm 286. This worm may be similar to the worm 39 of Fig. 8, and may drive the shaft 43' by means of intermediate worm and beveled gears 40', 41' and 42', corresponding to the gears shown in a similar relationship in Fig. 8. The clutch element 285 is shown as provided with a circumferential groove 287, engageable by a fork 288; and this fork may be laterally movable (to cause an engagement of either the gear 282 or the gear 283) by means such as electro-magnets 289 and 290 (respectively in circuits or branches k and l) adapted alternatively to attract an armature 291, shown as attached to the clutch fork 288 at an intermediate level above a pivotal support 292 therefor. It will be obvious that energization of one or the other of the mentioned electromagnets may be relied upon to cause a relatively rapid or a relatively slow rotation of the shaft 284, and thereby a corresponding rotation of the arm 19; and, in order that impulses initiating the cyclical movements of the arm 19 may be concurrently varied in a consistent manner, I may employ special transmission means between the clock 275 (Fig. 13) and the rotating arm 179.

For example, in case I use a sprocket chain 293, instead of extending the same directly over a shaft 294, carrying the arm 179, I may carry the same over a sprocket 295 on an intermediate shaft 296; and I may pivot on the shaft 294 a frame 297, shown as supporting additional shafts 298 and 299, and as integral or rigidly connected with a switch handle 300. I show the shaft 298 as carrying a small sprocket 301, engaging the sprocket chain 293, to be driven thereby, and as carrying also a larger sprocket 302, over which extends a sprocket chain 303, for the transmission of comparatively rapid movements to the shaft 294; and I show the shaft 299 as carrying a comparatively large sprocket gear 304, for alternative engagement with the sprocket chain 293, and also a larger sprocket wheel 305, over which extends a sprocket chain 306, alternatively to rotate the shaft 294 at a slower rate; I also show the switch handle 300 as carrying a pair of bridging contacts 307 and 308, adapted respectively to cooperate with contact pairs 309 and 310 in the respective circuits k and l of the mentioned electromagnet circuits 289 and 290,—so that the shifting of the clutch element 285, to produce a relatively rapid rotation of the arm 19 may be accomplished incidentally to a correspondingly rapid rotation of the arm 179. It will be noted that the use of the described means for varying the total period of traffic-control cycles and synchronizing the withdrawal movements of the stop 188, as effected by the crank or cam 190 (Fig. 2) is entirely consistent with the use of my described means for locally or centrally controlling the subdivision of such total periods, to permit a longer or shorter relative time of movement in (say) a north-and-south direction, as compared with an east-and-west direction; and it is also consistent with the use of means for a very complete automatic control, as hereinafter described.

*Central call to local police; and response*

As in my prior application, Serial No. 741,257, now Patent No. 1,875,748 I may associate with various traffic-control devices and special alarm devices, as referred to, means for use conjointly with the police call light 27, permitting communication between, for example, a police central station, and local traffic officers. For example, I may so mount the mentioned light 27 upon a frame 311 (Figs. 1–5) e. g., by means of a hinge 312, as to provide a door affording access to a telephone 313, mounted on a hook 314: and the lifting of the telephone instrument 313 from said hook may be incidentally effective not only to close a telephone circuit T, establishing communication with an officer at a central station, but also to open a switch 315 (see Fig. 9) in a circuit *m* (which may contain call light 27 and optionally also a call bell B) containing, at the central station, a light 316,—so that the lifting of the telephone instrument automatically affords assurance, to the central officer, that the local officer has responded and is ready to receive any desired communication,—such as orders regarding the arrest of escaping criminals.

*Central routing of special vehicles and fire apparatus*

Although the various described features of my signal units may be used in connection with any preferred central means for routing fire apparatus and/or police or ambulance vehicles, I prefer to use, in connection with the described automatic and manually manipulable devices, special routing charts of the general character illustrated in Fig. 9, each chart being in the form of a map showing intersecting streets, as north-and-south streets and east-and-west streets. These intersecting streets may advantageously be indicated by actual grooves or channels in the surface of the chart, and switches comprising circuit-closing buttons 320 and opening buttons 321 are preferably so disposed relatively to the mentioned intersecting grooves that the rapid advance of the finger of an officer, at the central station, along the grooves representing the streets to be traversed by fire apparatus, or the like, may be automatically effective to depress buttons 320,—thereby, in the case of a fire central station, closing circuits *n* and comprising magnet 118*f'* to energize electromagnets 142*f* (see Figs. 5, 8 and 9) to shift clutch gears 195*f*, and thereby initiating a shifting of the fire vanes 29*f* with the additional results above described.

Subsequent pressure upon the buttons 321 may be effective not only to open one switch and close another controlled by buttons 320 and 321, but to energize electromagnets 119*f'* and 114*f*, in circuits *o* after fire apparatus shall have traversed the indicated route; and, depending upon whether the fire alarm is turned in during the night or during the day (that is to say, during the period when the described traffic-control devices are operating) the energization of the last mentioned electromagnet may be incidentally effective, by means of the general character above described, either to restore the vanes 28, 28' and 29*f* all to inoperative and substantially invisible positions, or to reestablish connections, through the lateral movement of rod 247*f*, to restore to operation the various described traffic-signalling devices.

*General system and complete automatic control*

Routing charts of the general character just described may be used not only at a fire central station or stations, but at police and/or ambulance stations. The general mode of operation of all features of my signal units, and the interrelations between the same, having been described above in connection with the descriptions of the respective parts thereof, a complete wiring system for the same may have the general character indicated in Fig. 9; and, if lights 322 are provided in connection with the fire central station routing chart 326 (and/or in connection with similar charts used at a police patrol vehicle and/or an ambulance vehicle central station) such lights (unlike the response-indicating lights 316 of the police-call central station—which may or may not be distinct from the police patrol vehicle central station) may be used to indicate merely which of the central switches (energizing the local electromagnets 141*f*, in the case of the fire central station) is closed.

To illustrate the relationships above mentioned, it may be assumed, for example, that a police central station 323 is located, (as suggested in a chart 324, shown near the center of the top of Fig. 9) on third street, east of D street; that a fire central station 325 is located (as indicated in chart 326) on E street, between 1st street and 2nd street; and that a hospital or ambulance central station 327 is located (as indicated on a chart 328) at the corner of 1st and D streets; and that signal units U are installed at all intersections. It will be understood that not only the described parts of a synchronizing means as shown in Fig. 13 and/or a police call chart 324 (and/or a police vehicle chart, not shown, because entirely similar to chart 328) but also pairs successively engageable by a bridging contact (Fig. 13) to close either of the circuits (*t*), (*r*) through electromagnets 118 and 119 (for shifting the cam rods 114, 114' to advance or retract the latch rods 112, 112' at the beginning and at the end of a traffic-control day) may be located at a central police station.

As best shown in Fig. 13, if automatic, time-controlled shiftings of these synchronizing means are desired, I may provide, as by branches or circuits *p* and *q* (energized by, for example, the central source 180 but distinct from the branch *a''*, which may contain a separate switch 331) for the use of electromagnets 332 and 333 opposite an armature 334 on handle or lever 300, to shift said handle or lever, for the purpose of alternatively closing contacts, as described, in the respective circuits or branches *k* and *l*, which respectively include the electromagnets 289 and 290, for the shifting of the clutch comprising fork 288, Fig. 12; and the energization of electromagnets 332 and 333 may, if desired, be made dependent upon movements imparted by the clock 275,—as by connecting the hour-hand shaft 335 thereof (by means such as "1 to 2" sprockets 336 and 337, connected by means of a chain 338) with a shaft 339, carrying an arm 340 provided with a bridging contact 340'.

The contact 340', or its equivalent, may, if desired, be used not only to engage contact pairs 341, 341' in branch or circuit *p* (to energize electromagnet 332, closing circuit *k*, to slow the rotation of arm 19) and/or contact pairs 342, 342' (to energize branch or circuit *q*, containing electromagnet 333, for the opposite effect described) but also to close any desired additional circuits. For example, I show the arm 340 as disposed concentrically of a disc 343 bearing not only light-face numbers 1 to 12 inclusive, to represent the hours between midnight and noon, but also heavy-face numbers 1 to 12 inclusive, to represent the hours between noon and a following midnight; and I show contact pairs 344 and 345, respectively included in circuits *r* and *t* leading to the electromagnets 118 and 119 in the respective signals U as also positioned in the arcuate path of the bridging contact 340'. Thus the closing of the branch at (say) 5 o'clock A. M. may start a set of the signals U in operation at (say) 5 o'clock A. M.; the closing of branch *q* at (say) 6 o'clock A. M. may accelerate the rotation of arms 19; the closing of branch *p* at (say) 10 o'clock A. M. may again slow the rotation of arms 19 until (say) 3 o'clock P. M., when the bridging contact 340' may engage contact pair 342', again energizing branch q at (say) 6:30 o'clock P. M. engagement of contact pair 341' may again slow the arms 19; and the traffic day may be ended by the closing of branch t, upon engagement of contact pair 345 at (say) 10 o'clock P. M.; and, if desired, the mentioned slat-shifting switches sc and s'c may comprise additional contact pairs 346, 346' and 347, 347' respectively included in circuits or branches u (containing electromagnet 84) and v (containing electromagnet 85) in order that the time allotment of (say) the east-and-west traffic may be automatically increased or decreased between say 7 o'clock A. M. and 8 o'clock A. M. and again between 4 o'clock P. M. and 5 o'clock P. M.

If the switches, such as are suggested at 348 (in C) and 349 (in D) have been so shifted (say before 5 o'clock A. M.) as to put signals U in commission and to subject the traffic-regulating devices of all signals U of a given group to central control, and if a fire then breaks out on (say) south B street, by running his forefinger along grooves in chart 326, in the general manner indicated by the dotted arrow 350, the fire chief may immediately transform all signals U at the intersections 351 in the general manner above described; if an officer at the ambulance central 327, receiving word of an accident on south D street, closes switches on his chart 328, as by moving his finger in the manner indicated by the dotted arrow 352, although the siren in the unit U at intersection 353 may be caused to sound continuously, the sirens at common intersections 354 will be caused to sound intermittently—between intervals in which the central red "Fire" signal light flickers; and if, by reason of a report of a hold-up on west 3rd street, a central police officer then desires to communicate with officers at the intersections 355, he can do so, without disturbing the operation of the described features of my signals, by moving his finger as indicated by the dotted arrow 356, on chart 324; and the attention of the respective local officers will be indicated by the extinguishment of the corresponding lights 316 of said charts,—the relationship of switch-closing button 357, provided at each intersection on said chart and an associated closing button 358, and to an associated light 316 being preferably as diagramed at 359, in order that the central officer may be able to tell, by the successive extinguishments of the lights 316 which officers have reached their respective signals and taken up their instruments 313, to listen to such orders as he may be shouting into a central transmitter 360 connected with telephone lines T, extending to any or all of the units U. I show the described police call devices as energized from the same source 180 as the synchronizing and/or automatic timing features (but disclosed in Fig. 13) and the fire central and ambulance central as respectively provided with additional sources of energy 361 and 362, but it will be recognized as immaterial in practice, whether or not this independence is maintained—the described features being, in any event, correlated in the respective units U; and, as a matter of fact, only one of the units U that are intended to operate in close conjunction (as the four units, at any intersection), need be provided with a drum 18 or arm 19 or rotating means therefor—for the reason that wires carried to a drum in one master unit MU may govern the operation of motors and driven parts in any number of skeleton units SkU connected therewith.

It will thus be understood that, when complete automatic central control of traffic signalling operations is to be provided for in conjunction with all the described features, main trunks 363 (Fig. 14) including, e. g., all wires crossed by the dotted line w—w, Fig. 9, may be carried to any desired number of complete or master units MU (said master units being either identically controlled by a single set of contact pairs disposed within reach of the bridging contact on arm or variously controlled by different arrangements of analogous contact pairs); and each master unit may be used to control any desired number of skeleton units SkU, as by interposing the same, either in parallel or in series, in lesser trunks 364,—which may be formed of those wires across which the dotted line z—z extends, in Fig. 9. Thus, even though each signal unit be provided with all of the described signalling devices (even including one or both of the police call signals 27 and B) the various wires used in automatic control and a telephone line need be carried only to the master signals MU; and only said master signals need be provided with switches sl and s'l, respectively suitable for shifting the slats 56 (and thereby varying the time-allotment of the respective intersecting streams of traffic) in the case of signal units positioned so high as to render direct use of the handle 87 inconvenient; but, if desired, in order to make some use of the fire signal vanes 29f even when the word "Fire" is not shown, the commonly-displayed sides of some or all of these slats 29f may optionally be provided (somewhat as suggested by dotted lines at 365 in Fig. 1) with the names of streets.

Although I have herein described a single complete embodiment of my invention, suggesting various alternatives as to detail, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. A signal unit comprising vanes provided with a "Fire" legend on one side and with the name of a street on the other side thereof and means for shifting said vanes.

2. A traffic signal unit comprising: a signaling device; and a transmission mechanism including a gear to impart motion to said device; a shiftable clutch connected to the gear and arranged to connect and disconnect the mechanism; a cam disc having cam faces, driven by the mechanism when the clutch is in engagement; and a cam follower movable transversely of the cam faces to active and inactive position, said follower when active cooperating with the cam face to control the cluch.

3. A signal unit comprising means for the routine regulation of sectioning streams of traffic by allotting time intervals thereto; said means including signal elements; a series of spaced contacts, and circuits controlled by said contacts; means for varying the spacing of the contacts to vary the time intervals of the energization of the circuits without varying the duration of the total cycle of signal change, means rendering said elements responsive to energization of said circuits, means locally at the signal unit to control said varying means, and means at a place remote from said unit also to control said varying means.

4. In a traffic signal, movable signal members having a "Go" indication when in one position and a "Stop" indication when in a second position, a constantly rotating motor, a clutch member rotatively driven by said motor, a second clutch member for cooperative engagement therewith, a mechanism connecting said movable members with the second clutch member, means for bringing said clutch members into engagement whereby the first clutch member rotates the second clutch member and thereby moves the signalling members toward their different signalling positions, means operative upon a predetermined rotation of said second clutch member to render said second named means inoperative whereby the signalling members are stopped in proper signalling position, electromagnetic means which when energized render the third named means ineffective, a circuit closer having means for periodically closing electrical contacts, means connected to said motor for continuously operating said circuit closer, a source of electrical energy, electrical circuits connecting said source of energy, said contacts and said electromagnetic means whereby the electromagnetic means is periodically energized.

5. A traffic signal as defined in claim 4 including means for varying the period of time between the successive closing of said contacts.

6. A traffic signal as defined in claim 4 including means for manually varying the period of time between the successive closing of said contacts.

7. A traffic signal as defined in claim 4 including means controlled from a remote point for varying the period of time between the successive closing of said contacts.

8. A traffic signal as defined in claim 4 wherein the means connecting said motor and said circuit closer is operable to drive the circuit closer at one of several different constant speeds, and means controlled from a remote point to select said constant speed.

9. A traffic signal as defined in claim 4 including means for rendering the means connecting said circuit closer and said motor ineffective as such once in every revolution of said circuit closer, and means controlled from a remote point for restoring the effectiveness of said connecting means.

10. In a traffic signal, movable signal elements having "Stop" and "Go" indications, a drum having spaced contacts thereon, an arm having co-operative contacts adapted to engage the spaced contacts, means for relatively moving said drum and arm substantially at a constant speed whereby the arm contacts periodically engage the spaced drum contacts, electrically-operated means, controlled by the said engagement of said contacts, for operating said signal elements whereby the indications are displayed in a routine traffic cycle, and means, controlled from a remote point, for varying the spacing of said drum contacts whereby the division of the "Stop" and "Go" indications in the cycle is changed.

11. In a traffic signal, a plurality of movable signal elements having "Stop" and "Go" indications, a continuously revolving shaft rotating at a constant speed, means for periodically connecting said shaft to said signal elements whereby a routine traffic control cycle is obtained, means for continuously driving the first named means from said shaft whereby a traffic cycle of fixed time is obtained, and means for varying the time of the periodic connecting operation of the first named means whereby the time division of the "Stop" and "Go" indications in the cycle be changed.

12. In a device as in claim 11 wherein the last named means is provided with means for manually affecting the variation.

13. In a device as in claim 11 wherein the last named means is provided with remote control means for affecting the variation.

14. The combination in a street signal system having a multiple of "Stop" and "Go" indicating elements operable by locally energized means to alternately change said indicating elements to indicate "Stop" and "Go" to different traffic lanes for periods of time changeably controlled from a central station, including means operable from a central station for controlling the duration of operation of said system wherein said indicating elements may be rendered inoperative in a non-indicating position for desired periods of time, of means operable from a central station for controlling a fire or other indicating device in conjunction with said "Stop" and "Go" indicating elements, and when said "Stop" and "Go" indicating elements are inoperative, of rendering said indicating elements to indicate "Stop" to all traffic lanes during a fire signal, by means of said locally energized means.

15. A traffic signal for intersecting streets, comprising a unit having pairs of oppositely disposed faces directed toward intersecting streets, traffic signal vanes on each face, a local motor, having a shaft, mechanisms connecting oppositely disposed signal vanes for simultaneously moving them to different signal positions, clutches each having a driven member and a cooperating driving member, the latter attached to the said shaft, means driven by said local motor for connecting said driven member to a said mechanism whereby movement of the vanes can be obtained including means when its operation is initiated for connecting said driven member to its cooperating driving member and to move the vanes of a pair from one signalling position to another, and then disconnect the driven member from the driving member, and means driven by said local motor for intermittently initiating the last named means.

16. A street signal system comprising a multiple of signal elements having "Stop" and "Go", fire, ambulance, police car and other visual and auditory traffic controlling indicating means incorporated therein, normally constantly operating local means for controlling the indicating of the "Stop" and "Go" indications including a motor constantly operating during the periods of operation of said signal system, a circuit closer controlling the operation of said "Stop" and "Go" indicating means comprising a stationary drum-like contact member and rotating contact members adapted to be operated at a constant speed by said motor during operation periods to provide means to operate said traffic controlling means accurately to predetermined time periods; and means operable from a central station to energize or de-energize said motor, to vary said predetermined time periods, to temporarily interrupt the said local "Stop" and "Go" indicating means, to operate said fire and other traffic controlling means at any position of said "Stop" and "Go" indications and during said interruptions, to cause said "Stop" and "Go" indications to indicate "Stop" to all traffic lanes during the period of operation of said traffic controlling means, and means to actuate said "Stop" and "Go" indicating means by said circuit closer, when in operation, at the completion of a signalling operation of one of said traffic controlling means.

ALEXANDER J. MASSEY.